Feb. 7, 1933. C. E. HATHORN 1,896,234
TAIL WHEEL
Filed May 1, 1931

INVENTOR
CHARLES E. HATHORN
BY ATTORNEY

Patented Feb. 7, 1933

1,896,234

UNITED STATES PATENT OFFICE

CHARLES E. HATHORN, OF HEMPSTEAD, NEW YORK, ASSIGNOR TO CURTISS AEROPLANE & MOTOR COMPANY, INC., A CORPORATION OF NEW YORK

TAIL WHEEL

Application filed May 1, 1931. Serial No. 534,181.

This invention relates to aircraft and more especially to tail wheels for airplanes. Herein I have shown and described a tail wheel and control therefor which is steerable and yet may, on occasion, swivel freely through approximately 360°.

Prior to my invention tail wheels for airplanes have been provided which could swivel through 360°, but in all such cases, the tail wheel could not be steered. Moreover, control means for tail wheels have been provided capable of steering said wheels. However, in such cases it has been impossible to swivel the tail wheel when necessary. Never, so far as I am aware, have these two advantageous features been provided in combination.

One of the objects of my invention is to provide a normally steerable tail wheel for an airplane which may yet, under excessive loads, be free to follow the airplane.

Further objects will be apparent from a reading of the subjoined specification and claims and from a consideration of the accompanying drawing.

In order to explain the invention more clearly one embodiment thereof is shown in said drawing, in which.

Figure 1:
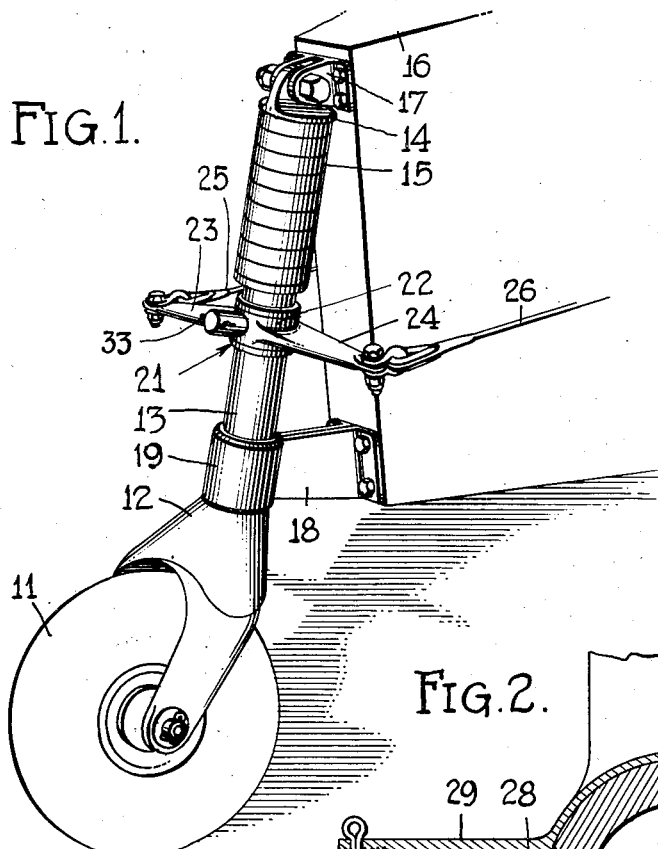
Fig. 1 is a perspective view of a portion of the tail of an airplane including the tail wheel and the tail wheel post and a part of the control bracket and control cables by which the wheel may be steered.

Referring particularly to the drawing, I have shown a tail wheel 11 mounted on a yoke 12 which is carried at the lower end of the tail wheel post 13. The upper end of the tail wheel post 13 is adapted to telescope in and coact with an upper sleeve 14 and rubber doughnuts 15 to form a shock absorber. This shock absorber may, if desired, be of the oleo type. The tail wheel assembly is secured to the rear part of the fuselage 16 of the airplane. For this purpose a bracket 17 secured to the upper part of the fuselage 16 is also secured to the upper end of the shock absorber cylinder 14. Another bracket 18 is secured to the lower end of the fuselage 16 and carries a sleeve 19 through which the tube 13 may slide. It may thus be seen that save for devices yet to be described, the tail wheel 11 may pivot about the axis of the post or tube 13, said post turning in the sleeve 19 and in the cylinder 14.

Figure 2:
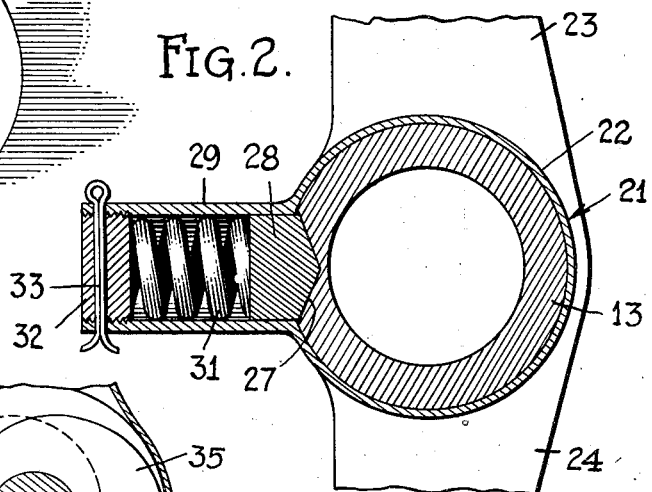
Fig. 2 is an enlarged view of a portion of the same in horizontal section, the section being taken through the tail wheel post.

However, means are provided for releasably restraining the swiveling movement and allowing the pilot some measure of control over the position of the tail wheel and thus allowing him to steer the tail wheel. Surrounding the tube or post 13 above the sleeve 19 is a fitting 21 which includes a tubular sleeve 22 having secured thereto outwardly projecting arms 23 and 24 to which are attached the cables 25 and 26 leading forward to the cockpit of the airplane where they may be operated by the pilot in any suitable manner. As may be seen more clearly in Fig. 2 the exterior periphery of the tube 13 is provided with a notch 27 into which a plunger 28 is adapted at times to protrude. The fitting 21 is provided with an offset cylindrical portion 29 in which the plunger 28 is adapted to slide and the portion 29 also carries a compression spring 31, and a plug 32 held in the end of the portion 29 by a cotter pin 33. The spring 31 continuously urges the plunger 28 toward the tube 13. Therefore normally the pointed end of the plunger 28 protrudes into the depression 27 of the tube 13 but when any excessive load tends to turn the wheel 11 from the position in which it is held by the pilot's control the plunger 28 compresses the spring 31 and rides out of the notch 27 allowing the tube 13 and the wheel 11 to turn and follow the airplane. Thus, the pilot may, under all ordinary circumstances, steer the wheel 11 in order to control the taxiing movement of the airplane wherever he desires. However, when the loads become too great the wheel 11 becomes substantially freely swiveling, prevents breaking of the tail wheel assembly and decreases the chance of turning the airplane over on one wing.

Figure 3:
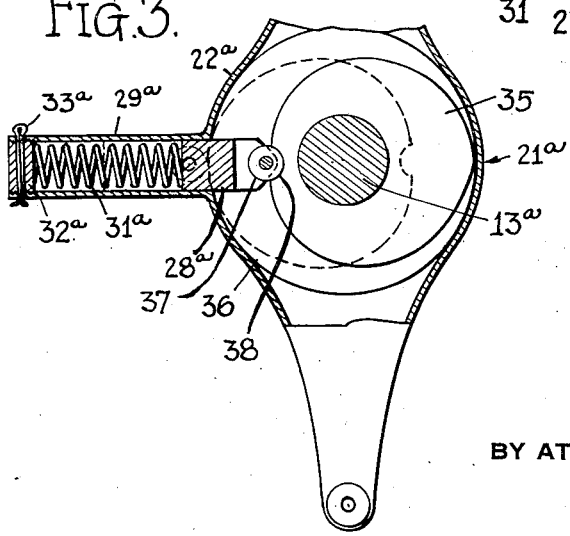
Fig. 3 is a view similar to Fig. 2 showing a modified form of my invention.

In Fig. 3 I have shown a modified form of fitting also constructed according to my invention. Therein, the fitting 21ª corresponds generally to the fitting 21 shown in Fig. 2. Secured to the tail post 13ª is a cam 35 of special design. The outlines of this cam 35 are in general heart-shaped as may be seen clearly in Fig. 3. Secured to or formed with the heart-shaped cam 35 and positioned beneath said cam, is a substantially circular flange 36 which fits within the circular contour of the tubular sleeve 22ª and thus serves to position the cam 35 and the post 13ª within the sleeve 22ª. If desired, a similar flange may also be positioned above the cam 35. The fitting 21ª also includes a cylindrical portion 29ª adapted to contain a plunger 28ª, a spring 31ª and a plug 32ª held in place by a cotter pin 33ª. The heart-shaped cam 35 is provided with a notch or depression 38 into which a roller 37 rotatably mounted on the end of the plunger 28ª is adapted to protrude. This form of my invention is the preferred embodiment thereof inasmuch as the structure provided automatically returns the tail wheel to a position in which the roller 37 of the plunger 28ª protrudes into the notch 38. It may be seen that as the roller 37 rides up on a surface of the cam away from the notch 38, the spring 31ª becomes more compressed and tends to turn the cam 35 and the post 13ª toward a position in which the roller 37 protrudes into the notch 38. This tendency is increased until the roller 37 rides up on the high part of the cam which is substantially opposite the notch 38, whereupon the force of the spring tends to continue the rotation of the cam on to the normal position in which the plunger protrudes into the depression 38.

It is to be understood that the above described embodiment of the invention is for the purpose of illustration only, and various changes may be made therein without departing from the spirit and scope of the invention.

I claim as my invention:

1. In an airplane in combination, a tail wheel, a tail post to which the tail wheel is secured, a cylinder within which the tail post telescopes, a fitting normally connected to said tail post, means to rotate the fitting to steer the wheel under normal conditions, differential action being permitted between the post and the fitting under abnormal loads, and means for restoring the positive connection between the fitting and the tail post after the release from the abnormal loads.

2. In an airplane in combination, a tail wheel rotatable at times through approximately 360°, a cross arm, means to control the position of the cross arm, a releasable connection between the cross arm and the tail wheel, and means for tending to restore the connection after it has been released.

3. In an airplane in combination, a tail wheel, a tail post to which the tail wheel is secured, a cylinder within which the tail post telescopes, a fitting normally connected to said tail post, said connection comprising a plunger and a heart-shaped cam coacting with said plunger.

4. In an airplane in combination, a tail wheel, a tail post to which the tail wheel is secured, a cylinder within which the tail post telescopes, a fitting normally connected to said tail post, said connection comprising a plunger, a roller rotatably mounted on said plunger and a heart-shaped cam coacting with said plunger.

5. In an airplane, in combination, a tail wheel rotatable at times through approximately 360°, a steering arm, means to control the position of the steering arm, a releasable connection between said steering arm and said tail wheel, and means cooperating with said releasable connection for reating siliently urging said tail wheel to a position at which said connection is re-established.

6. In an airplane, in combination, a tail wheel, a steering arm, means for releasably retaining said tail wheel in fixed relation with said steering arm, and mechanism for urging the return of said tail wheel upon displacement thereof from said fixed relation.

In testimony whereof I hereunto affix my signature.

CHARLES E. HATHORN.